United States Patent [19]

Hoyt et al.

[11] 4,135,026

[45] Jan. 16, 1979

[54] ALCOHOLYZED ETHYLENE-VINYL ACETATE PACKAGING MATERIAL

[75] Inventors: John M. Hoyt, Cincinnati; Joseph Fischer, Fairfield, both of Ohio

[73] Assignee: National Distillers and Chemical Corp., New York, N.Y.

[21] Appl. No.: 817,494

[22] Filed: Jul. 20, 1977

Related U.S. Application Data

[63] Continuation of Ser. No. 524,728, Nov. 18, 1974, abandoned.

[51] Int. Cl.² .................. C08F 216/06; C08F 8/00; C08F 6/00; C08F 6/08
[52] U.S. Cl. .................................. 428/220; 426/129; 428/339; 526/8; 526/9; 526/10; 526/11
[58] Field of Search .................................. 526/8–11; 428/339, 220

[56] References Cited

U.S. PATENT DOCUMENTS

| | | | |
|---|---|---|---|
| 2,703,794 | 3/1955 | Roedel | 526/93 |
| 3,114,736 | 12/1963 | Bartl et al. | 526/8 |
| 3,386,978 | 6/1968 | Salyer | 526/11 |
| 3,510,463 | 5/1970 | Bristol | 526/10 |
| 3,523,933 | 8/1970 | Inskip | 526/10 |
| 3,547,858 | 12/1970 | Worall | 526/47.6 |
| 3,585,177 | 6/1971 | Gardner et al. | 526/8 |
| 3,595,740 | 7/1971 | Gerow | 428/349 |
| 3,780,004 | 12/1973 | Hoyt et al. | 526/14 |
| 3,847,845 | 11/1974 | Tada et al. | 526/11 |

OTHER PUBLICATIONS

F.D.A. Exhibit Chapter I 121.2526 (p. 511) to 121.2526 (p. 526).

*Primary Examiner*—Herbert J. Lilling
*Attorney, Agent, or Firm*—Kenneth D. Tremain

[57] ABSTRACT

Alcoholyzed ethylene-vinyl acetate resins and unplasticized, thermoplastic packaging films constituted thereof which are suitable as food wraps, particularly for the packaging of fresh red meat. The alcoholyzed resin is prepared from an ethylene-vinyl acetate copolymer containing from about 9 to 45 weight percent combined vinyl acetate and having a melt index of from about 0.1 to 70 g/10 min., the alcoholyzed resin containing from about 5 to 20 weight percent residual vinyl acetate and having a melt index of from about 0.1 to 100 g/10 min. Preferred films prepared from these alcoholyzed resins exhibit oxygen transmission rates in excess of about 350 cc/100 sq.in./24 hr./atm. at 23° C, carbon dioxide transmission rates in excess of about 1000 cc/100 sq.in/24 hr./atm. at 23° C, and moisture vapor transmission rates of from about 10 to 50 g/100 sq.in./24 hr. at 100° F and 90% relative humidity (R.H.), essential characteristics of the thermoplastic films for wrapping cuts of fresh red meat.

6 Claims, No Drawings

ALCOHOLYZED ETHYLENE-VINYL ACETATE PACKAGING MATERIAL

This is a continuation of application Ser. No. 524,728, filed Nov. 18, 1974, now abandoned.

BACKGROUND OF THE INVENTION

In current distribution practice, fresh meat is shipped from the slaughterhouse in the forms of large sections comprising as much as a quarter, half or even a whole carcass. These large sections of fresh meat are then cut into smaller weight units called primal cuts and then into subprimal cuts. Upon arrival at the store or central packaging facility the primal or subprimal cuts are further subdivided into retail portions, i.e., roasts, steaks, chops, etc. for ultimate display to the customer.

It is desirable that the final cuts retain their red appearance when on display for prolonged periods of as long as several days. While discoloration of the meat is not per se indicative of inferior quality, consumers overwhelmingly prefer the normal red color of fresh meat. In order to preserve the red meat appearance, and to provide a sanitary package, it has been conventional practice to wrap and heat-seal each cut in plastic film immediately after cutting. Plastic film so utilized must have certain critical physical properties which will insure that the red-meat appearance of the retail cuts will be maintained for the desired period of time under display conditions. For example, it is known that the rate of oxygen transmission through the film should be greater than about 350 cc/100 sq.in./24 hr./atm. at 23° C. If the oxygen transmission is lower than this value, the meat contained in the package will darken in a few hours, a factor that will seriously reduce customer acceptance. On the other hand, as long as the oxygen transmission rate of the meat wrap film is above about 350 cc/100 sq.in./24 hr./atm. at 23° C., the fresh meat will retain its desirable red color. No upper limit exists in any practical sense for the oxygen transmission rate.

In addition to having the above-noted threshold oxygen transmission rate, it is also desirable that the film have a comparatively high rate of carbon dioxide transmission. Carbon dioxide transmission rates of greater than about 1000 cc/100 sq.in./24 hr./atm. at 23° C. are also desirable and are of importance, for example, in the so-called blast freezing of meat with carbon dioxide at temperatures of −70° F. or thereabouts. A high rate of carbon dioxide transmission is necessary to insure that essentially all carbon dioxide retained by the frozen meat can escape when the package is subjected to normal refrigeration temperatures.

Thermoplastic film for wrapping retail cuts of fresh red meat should also possess a proper water or moisture vapor transmission rate (MVTR). It is desirable that the MVTR not exceed about 50 cc/100 sq.in./24 hr. at 100° F. and 90% R.H. If the MVTR is substantially in excess of this value, the meat contained within the package will tend to lose comparatively large amounts of water during display, the weight of the packaged meat will decrease and the cut itself will dry out. The MVTR value must not, however, be too low; otherwise droplets of water may condense and accumulate on the inner surface of the package, a phenomenon commonly known as "fogging". To help prevent fogging of fresh meat-wrap film, it is desirable to select film with an MVTR value of at least 10 g/100 sq.in./24 hr. at 100° F. and 90% R.H., although fogging may be ameliorated by the addition of anti-fogging agents to the resin employed in making the film.

The aforesaid gas transmission rates may be determined by various methods known in the art. For example, oxygen and carbon dioxide transmission rates may conveniently be measured with a Dohrmann Polymeric Permeation Analyzer, PPA-1 (Dohrmann Envirotech Corporation, Mountain View, California). The Dow Cell may also be employed for this purpose, in accordance with ASTM procedure D-1434. The water or moisture vapor transmission rates (MVTR) may be determined in a General Foods Chamber (ASTM procedure E 96) or with a Honeywell Model W 825 Water Vapor Transmission Rate Tester (Honeywell, Inc., Minneapolis, Minnesota) and the rates obtained therefrom converted into General Food units.

Although the preceding gas and vapor transmission properties are of primary importance, it is additionally desirable, for esthetic reasons, that the film be substantially colorless and clear. Clarity is measured by the relative amount of haze present, as determined by ASTM Method D1003-61. For red meat packaging film the haze level should be as low as possible, and preferably less than 1%. The film should also have high gloss and sparkle.

Another important characteristic for food wraps of this type is the property called "cling", which refers to the tendency of the film to adhere to itself or to the container, over or around which it is wrapped. Also, it is important that the film exhibit a high yield strength to prevent stress relaxation which will make the package unsightly. A retail cut which is tightly overwrapped loses customer appeal if the taut film loses its tension and assumes a loose overwrap configuration.

Additionally, the film must have adequate tensile strength as well as high resistance to tearing and to puncture. The film must be heat-sealable, and should not release objectionable, noxious fumes during the heat-sealing operation required after the retail cuts have been wrapped.

For economic reasons, since commercial resins are sold by unit weight, but used by unit area, it is advantageous that resins intended for film wraps have as low a density as possible. In addition, it is also economically advantageous if the properties of the resin are such as to permit the use of film of minimum thickness or gauge, and if such film of minimum gauge can be produced by conventional film-blowing equipment.

It is known in the art that plasticized polyvinyl chloride (PVC) film successfully meets many of the noted requirements for fresh red meat wrap, and large amounts of these resins are consumed yearly for this purpose. Nevertheless, the use of vinyl chloride-based resins for wrapping retail cuts of fresh red meat has certain inherent shortcomings. For example, it has been reported in recent years that the plasticizer, normally comprising 25–50 weight percent of a total plasticized PVC composition, may be extracted by the fatty tissues of the meat and even accumulate in the human body, with possibly unfavorable consequences. Moreover, since the compounding of PVC requires the presence of various stabilizers, for example, barium and cadmium salts and certain organotin compounds, the possibility of the extraction of these materials must also be taken into consideration; as a consequence the list of acceptable stabilizers and other compounds permitted in PVC food applications is quite limited.

More recently, however, great concern has arisen because of growing evidence that a rare form of liver cancer (angiosarcoma) may be attributable to vinyl chloride monomer (Chem. & Eng. News, page 6, Feb. 18, 1974). Experiments have shown that this form of cancer can be induced in rats at vinyl chloride atmospheric concentrations as low as 250 ppm. Prior to packaging and shipping, PVC resins reportedly can contain from 500 ppm to 3000 ppm of vinyl chloride monomer (Chem. & Eng. News, page 16, Feb. 25, 1974).

In addition, when plasticized PVC film is used to wrap retail cuts of fresh red meat, the film is heat-sealed after packaging. Workers performing the packaging are exposed to whatever noxious fumes may be evolved in the heat-sealing operation, and it has recently been claimed that serious respiratory difficulties may arise from such exposure.

Although the packaging of fresh red meat is of principal concern in connection with the present invention, it is also known that PVC film is widely used for in-store packaging of produce such as fresh fruit and vegetables. Whereas such produce does not impose direct contact of the PVC film with fatty tissues, as is the case in meat packaging, many of the other disadvantages of the PVC film are pertinent to produce packaging. Thus, noxious fumes may be evolved in heat-sealing operations and additive residues of potentially toxic materials may be transferred from the packaging film to the contents.

In view of the above-noted difficulties associated with the use of PVC-based resins in food applications generally, it is evident that a need exists for a film-forming resin which, ideally:

(a) equals or surpasses plasticized vinyl film in the above-noted gas and vapor transmissivity, and strength, optical and handling properties;

(b) meets the requirements of (a) without necessitating the addition of a plasticizer which might be extracted by the packaged fresh red meat;

(c) requires no added stabilizer that might also tend to be extracted by the packaged fresh red meat; and (d) contains no vinyl chloride monomer, or other associated substance capable of causing angiosarcoma.

According to the present invention each of these requirements is met by the provision of certain partially alcoholyzed copolymers of ethylene and vinyl acetate.

So-called copolymers of an α-olefin, e.g., ethylene, and vinyl alcohol are well known in the art and may, in general, be obtained by alcoholysis or saponification of the corresponding ethylene-vinyl ester copolymers (see, for example, Roland U.S. Pat. No. 2,386,347 granted Oct. 9, 1945). As a matter of fact, however, such copolymers of ethylene and vinyl alcohol are substantially terpolymers of ethylene, vinyl alcohol, and small amounts of residual vinyl ester (up to about 3 weight percent). Pure binary copolymers of ethylene and vinyl alcohol are difficult to obtain by any practical alcoholysis or saponification process known in the art because of the difficulty in reacting the last traces of copolymerized vinyl acetate units.

It is known in the art that substantially fully hydrolyzed ethylene-vinyl ester copolymers of the preceding type may be used as wraps for foods, medicines, and other substances. Thus, it has been disclosed in Gardner et al. U.S. Pat. No. 3,585,177 granted June 15, 1971, that certain lower alpha-olefin/vinyl alcohol copolymers with a residual vinyl ester content below 3% by weight exhibit an oxygen permeability of less than 1.0 cc/100 sq.in./24 hr./cm Hg/mil at 73° C. and a MVTR of less than 8.5 g./100 sq.in./24 hr./mil at 73° C. and 100% relative humidity, provided the alpha olefin content of the copolymer ranges from 5 to 40 weight percent. An ethylene-vinyl acetate copolymer containing from about 75 to 97 weight percent vinyl acetate would be required to make an ethylene-vinyl alcohol copolymer of this composition.

It is further known in the art (see Gerow U.S. Pat. No. 3,595,740 granted July 27, 1971) to make laminar structures containing a barrier layer comprising a copolymer of ethylene and 35 to 85 mole percent of a vinyl ester of a lower aliphatic monobasic acid, at least 85% hydrolyzed, which laminate has an oxygen permeability of less than 3 cc/100 sq.in./24 hr./atm. at 23° C.

It is clear from the foregoing discussion that the so-called ethylene-vinyl alcohol copolymers (containing less than 3% residual vinyl acetate), disclosed by Gardner et al. as packaging materials, as well as the laminate disclosed by Gerow, would be unsuited as wrapping or packaging films for fresh red meat or produce, which require oxygen transmission for good keeping qualities, because the oxygen transmission rate (<3 cc/100 sq.in./24 hr./atm. at 23° C.) is far too low; as pointed out above, wrapping film for fresh red meat should have an oxygen transmission rate of no less than about 350 cc/100 sq.in./24 hr./atm. at 23° C., otherwise the desirable red color of the meat is lost due to oxygen depletion. Furthermore, the MVTR of such packaging materials is too low for use as a fresh meat wrap. Again, as noted above, a MVTR of from about 10 to 50 g/100 sq.in./24 hr. at 100° F. and 90% R.H. is desirable to help prevent fogging of such wraps.

SUMMARY OF THE INVENTION

In accordance with the present invention, there is provided an alcoholyzed ethylene-vinyl acetate resin and an unplasticized, thermoplastic packaging film constituted thereof, having a carefully adjusted balance of properties making it ideally suited for the packaging of fresh red meat. The resin is prepared from an ethylene-vinyl acetate copolymer containing from about 9 to 45, preferably from 20 to 35, weight percent combined vinyl acetate, and having a melt index of from 0.1 to 70, preferably from 0.5 to 20, g/10 min. [as determined by the ASTM Method D1238-65T, Condition E]. The alcoholyzed resin produced therefrom contains from about 5 to 20, preferably from 8 to 18, weight percent of residual vinyl acetate, and has a melt index of from about 0.1 to 100, preferably 0.5 to 10, g/10 min.

Packaging film thus constituted has been found to exhibit an oxygen transmission rate greater than about 350 cc/100 sq.in./24 hr./atm. at 23° C., a carbon dioxide transmission rate greater than about 1000 cc/100 sq.in./24 hr./atm. at 23° C. and a moisture vapor transmission rate (MVTR) of about 10-50 g/100 sq.in./24 hr. at 100° F. and 90% R.H. In addition the film has excellent strength characteristics including high resistance to puncture and to tearing, as well as excellent optical properties, with less than about 1% haze. The film has excellent cling and may be heat-sealed without evolution of noxious fumes.

Satisfactory packaging material may be made from the alcoholyzed resin hereof in minimum thicknesses with conventional film-blowing equipment. In commercial practice, to minimize cost, PVC film for meat and produce packaging is widely employed at thicknesses of between 0.0006 and 0.0008 in. The resin of this invention can very readily be extruded into even thinner gauges (at least to 0.00035 inch.) without fear of degradation or snap-offs during the extrusion process, as is common when extruding PVC.

The partially alcoholyzed ethylene-vinyl acetate copolymers hereof differ both in composition and properties from those materials described in the above-mentioned Gardner et al. patent. The parent ethylene-vinyl ester copolymers employed for alcoholysis in accordance with the present invention incorporate substantially smaller proportions of the copolymerized vinyl ester than the copolymer reactants of Gardner et al, whereas the alcoholyzed products obtained contain substantially greater proportions of residual vinyl ester, i.e., the products of the present invention are only partial alcoholyzates as compared with the substantially complete hydrolysis products of Gardner et al. Moreover, the present partially alcoholyzed products are considerably richer in ethylene than the nominally fully hydrolyzed Gardner polymers. It is believed that these basic differences in composition account for the distinct oxygen and moisture permeability characteristics as well as contributing to the tear, puncture, and impact resistance properties, which distinguish the present alcoholyzed ethylene-vinyl acetate resin and establish its suitability as a meat wrap.

The alcoholyzed resins hereof are produced by the controlled partial alcoholysis of ethylene-vinyl acetate copolymers, as described in copending patent application Ser. No. 516,706 filed Oct. 21, 1974. As described in the said application, controlled, reproducible partial alcoholysis is assured by carrying out the hydrolysis reaction in solution in a hydrocarbon and a lower alcohol in the presence of an acidic or basic catalyst, while maintaining the total water content in the reaction medium at a substantially constant level, in continuous operation or from run to run. The partially hydrolyzed copolymer is recovered by precipitation with additional methanol, or alternatively by removal of the hydrocarbon solvent, unused alcohol, and acetate ester by-product by steam distillation at atmospheric pressure or at a reduced pressure.

Materials thus prepared may be efficiently and economically produced as compared, for example, with the fully hydrolyzed copolymers of the aforesaid Gardner et al. patent. First of all, less of the relatively expensive vinyl acetate monomer is required; secondly, the ethylene-vinyl acetate copolymer reactants may be readily manufactured employing conventional high pressure polymerization techniques used industrially to make low density polyethylene, and conventional initiators may be employed.

Moreover, the synthesis of the ethylene-vinyl acetate copolymers of Gardner et al. (which contain 75-97% vinyl acetate) must be carried out at 44-46° C., an unacceptably low reaction temperature for synthesis in a high pressure polyethylene plant. Also, the Gardner et al. process is essentially a solution polymerization wherein excess vinyl acetate monomer is employed as the solvent. Thus, the Gardner et al. copolymer is recovered in excess vinyl acetate monomer and in admixture with a large volume of methanol and hexane. Large amounts of unused vinyl acetate monomer, methanol, and hexane would have to be separated and recycled therefrom.

Additionally, it may be pointed out that great care is evidently necessary in the synthesis of the Gardner et al. copolymer to prevent the simultaneous production of homopolymers, especially polyvinyl acetate. The concurrent production of polyvinyl acetate leads to the appearance of polyvinyl alcohol in the subsequent hydrolysis step. Polyvinyl alcohol in the hydrolyzed copolymer product, which is detectable by differential thermal analysis (DTA) techniques, is of distinct disadvantage as regards the desired gas transmission properties of packaging films. By contrast, DTA analysis of the alcoholyzed ethylene-vinyl acetate copolymers of the present invention has established that neither polyethylene nor polyvinyl alcohol homopolymer is present therein.

PREFERRED EMBODIMENT OF THE INVENTION

The ethylene-vinyl ester copolymers utilized to prepare the partially alcoholyzed resins and packaging materials of this invention are normally solids at room temperature, and preferably comprise ethylene vinyl acetate copolymers. In passing, however, it may be noted that though the present description is principally directed to the use of vinyl acetate as the vinyl ester, similar materials, e.g., vinyl formate, vinyl propionate, vinyl butyrate, vinyl trimethyl acetate, or vinyl trifluoroacetate, may be similarly utilized.

As indicated hereinabove, the ethylene-vinyl acetates alcoholyzed may contain from as little as 9 to as much as 45 weight percent combined vinyl acetate. Best results have been obtained employing ethylene-vinyl acetate copolymers incorporating from about 25 to 30 weight percent vinyl acetate and having a melt index of from about 2 to 5 g/10 min.

The copolymer alcoholyzed may also contain small amounts of a further comonomer as, for example, a second vinyl ester (e.g., any of those mentioned hereinabove), carbon monoxide, methyl acrylate, n-butyl acrylate, di-n-butyl maleate, diethyl itaconate, acrylic acid, methacrylic acid, fumaric acid or the like. When such a third comonomer is incorporated in the initial polymer, it is utilized in amounts not ordinarily exceeding about 10% by weight thereof, the remainder of the copolymer reactant comprising the ethylene and vinyl acetate monomeric units in the same proportions disclosed above.

The partially alcoholyzed products prepared from the above copolymers as aforesaid are generally solids at room temperature, and have melt indexes which are somewhat higher than but dependent on the melt index of the respective parent ethylene-vinyl acetate copolymers. Particularly preferred alcoholyzates contain from about 10.6 to 14.5 weight percent residual vinyl acetate, and have a melt index of from about 4.4 to 5.1 g/10 min.

It has been found that, for any given ethylene-vinyl acetate copolymer reactant, a particular range of degree of alcoholysis is desirable for optimum packaging film properties. The following approximate correlation is suggested between the initial vinyl acetate content and the degree of optimum alcoholysis, based upon empirical studies:

| Parent EVA Copolymer (% Vinyl Acetate) | Alcoholysis Product, Optimum % Residual Vinyl Acetate |
|---|---|
| 15 | 5-9 |
| 20 | 8-12 |
| 28 | 10-15 |
| 35 | 13-18 |
| 40 | 18-25 |
| 45 | 20-26 |

When characterized by differential thermal analysis (DTA), the alcoholyzates of this invention are found to be at least partially crystalline, the location of the melting point endotherms being dependent on the residual vinyl acetate content. This relationship is demonstrated by the following data:

| Vinyl Acetate Content, Wt.% | | DTA Melting Point Endotherm °C |
|---|---|---|
| Parent Copolymer | Alcoholyzed Copolymer | |
| 19.8 | 12.2 | 90 |
| 25.3 | 6.5 | 98 |
| | 10.5 | 93.5 |
| | 14.5 | 86.2 |
| 39.1 | 23.5 | 71 |

The DTA melting points of the present materials thus contrast with those reported for the aforesaid Gardner et al. copolymers, which occur at about 170° C. It is clear that these prior materials have crystalline domains of much higher melting point that those of the resins hereof. Moreover, the DTA curves for the present materials do not contain melting point endotherms for either homopolymer, i.e., polyethylene or polyvinyl alcohol, as sometimes happens according to Gardner et al, if the ethylene-vinyl acetate copolymerization is not carried out at comparatively low temperatures under the rather inconvenient conditions of solution copolymerization disclosed therein.

The partially hydrolyzed copolymers hereof may be regarded as terpolymers of ethylene, vinyl alcohol and vinyl acetate repeating units. Typically, the proportion of residual vinyl acetate and vinyl alcohol units present is relatively comparable on a molar basis, and considerably less on a molar basis than the amount of combined ethylene units. In other words, on a molar basis, the terpolymers postulated are rich in ethylene, with minor but roughly equivalent amounts of vinyl alcohol and vinyl acetate units.

While the preceding is postulated as the structure of the partially alcoholyzed polymers of the present invention, it cannot be excluded that this simple, possibly too highly idealized, conception may possibly obscure other structural peculiarities which are responsible, in whole or in part, for the properties exhibited by the present material which make it suitable for packaging film. Accordingly, the structure here suggested should not be regarded as limiting.

The alcoholyzed ethylene-vinyl acetate resins may be readily and directly extruded into blown films suitable for the packaging of red meats and other food, without the addition of plasticizers or other additives. Blown film-forming may be effected in conventional apparatus, and films may be thereby produced having thicknesses as low as 0.35 mil. Films having thicknesses varying from about 0.35 to 1.0 mil, preferably from 0.4 to 0.80 mil, are particularly suitable for fresh red meat and produce packaging.

Films thus produced have been found to exhibit the oxygen, carbon dioxide, and moisture vapor transmission rates, and further desirable characteristics described hereinabove. When, for example, a particularly preferred alcoholyzate containing about 10.6 to 14.5 weight percent residual vinyl acetate and having a melt index of about 4.4 to 5.1 g/10 min. is so extruded into blown film about 0.75 mil in thickness, the oxygen transmission rate is about 580 cc/100 sq.in./24 hr./atm. at 23° C., the carbon dioxide transmission rate is about 2850 cc/100 sq.in./24 hr./atm. at 23° C., and the water vapor transmission rate is about 14.5 g/100 sq.in./24 hr. at 100° F. and 90% R.H.

A number of preferred embodiments of the partially alcoholyzed ethylene-vinyl acetate resin and packaging film of this invention are described in the following examples. In the examples, as well as the preceding description, all parts and percentages are given by weight unless otherwise indicated, and all temperatures are specified in degrees Fahrenheit. Further, the examples are intended as illustrative only.

EXAMPLE 1

Partially Alcoholyzed Ethylene-Vinyl Acetate Resin of the Invention

A resin useful in the production of a preferred packaging film hereof was made by the partial alcoholysis of a commercial ethylene-vinyl acetate copolymer. The latter may be produced in high pressure polymerization equipment used for the industrial production of conventional or low density polyethylene.

The particular lot of ethylene-vinyl acetate copolymer employed to make the partially alcoholyzed resin of this example contained 27.9 weight percent vinyl acetate, the remainder being ethylene, and had a melt index of 2.5 g/10 min. The partial alcoholysis was carried out in a 100-gallon reactor, substantially as described in the aforesaid copending application Ser. No. 453,242. The reactor had previously been carefully cleaned and dried and was provided with a nitrogen atmosphere, which was maintained throughout the alcoholysis procedure described hereinafter.

Four alcoholysis runs were carried out using the amount of benzene, methanol, and sodium hydroxide catalyst shown in Table I below. In each run the benzene was initially charged to the reactor, and the resin was then added in pellet form. The reaction mixture was stirred and heated to reflux. About one hour of stirring at reflux was sufficient to bring the resin into solution. The required amount of sodium hydroxide dissolved in methanol was thereafter added over a period of about 10 minutes, and the alcoholysis reaction was continued for an additional period of two hours, with stirring, at reflux.

The reaction was terminated at once by adding at reflux, the amount of glacial acetic acid set forth in Table I. Thereupon, also at reflux, sufficient additional methanol was added over a period of 15 minutes for reprecipitation of the alcoholyzed resin product. The resulting solution was cooled with stirring to about 90° F. to effect precipitation. The precipitated, partially alcoholyzed product was thereupon collected by filtration, washed with methanol, water, and finally methanol, and dried at 140°–150° F. under vacuum (28 in. Hg) in an Abbe rotary drier.

The product of each run was a colorless, granular solid, characterized in Table I. The four products in Table I were mixed and the composite sample was used to produce film for testing (see Examples 2–6).

TABLE I

PRODUCTION OF PARTIALLY ALCOHOLYZED EVA RESIN
EVA Copolymer Reactant: Vinyl Acetate, 27.9 Wt. %(1)
MI, 2.5 g/10 min.

| | | | Alcoholysis Reaction | | | | | | Product | | |
|---|---|---|---|---|---|---|---|---|---|---|---|
| | | Benzene | Methanol | | | CH₃COOH, | Methanol to | | Residual | | Na⁺ |
| Ex. No. | Resin lbs. | lbs. | H₂O ppm(2) | lbs. | H₂O ppm(2) | NaOH g. | glacial, ml. | precipitate product, lbs. | lbs. recovered | Vinyl Acetate wt. %(1) | MI. g/10 min. | ppm (3) |
| 1-1 | 75 | 226 | 780 | 40 | 255 | 300 | 650 | 165 | 63 | 12.7 | 5.1 | 70 |
| 1-2 | 85 | 256 | 780 | 45 | 255 | 340 | 750 | 190 | 73 | 14.5 | 4.7 | 300 |
| 1-3 | 85 | 256 | 524 | 45 | 244 | 340 | 750 | 190 | 73 | 10.6 | 4.4 | 320 |
| 1-4 | 85 | 256 | 558 | 45 | 455 | 340 | 750 | 190 | 76 | 13.1 | 4.8 | 98 |

(1) By saponification
(2) Karl Fischer analysis before addition to reactor
(3) Atomic absorption

EXAMPLE 2-6

Packaging Films Prepared from Resin of Example 1

The composited sample of partially alcoholyzed EVA resin described in Example 1 is converted into film as follows:

The granular composite sample is first pelletized by means of an extruder operating at 250°–300° F. The pelletized resin is then blown into film in standard blown film-forming equipment. Very thin gauge film, as low as 0.35 mil, is thus produced; film of 0.5 to 0.80 mil thickness, the gauge normally used in the packaging of fresh red meat with plasticized vinyl film, is easily made, and has desirable cling properties, as well as great clarity and sparkle.

The physical properties of films of various gauges made from the composited partially alcoholyzed resins of Example 1 are summarized in Table II. Comparative data are shown for a typical plasticized vinyl film conventionally used to package fresh red meat, and for film made from SURLYN ® 1603 (an ionomer resin for film application supplied by E. I. du Pont de Nemours & Co., Inc., Wilmington, Delaware). SURLYN ® 1603 contains a "food grade" additive to provide better handling properties in blown film, according to the manufacturer.

TABLE II

Properties of Films Blown from Composite Resin of Example 1

| Test | Plasticized Vinyl | SURLYN® 1603 | Ex. 2 | Ex. 3 | Ex. 4 | Ex. 5 | Ex. 6 |
|---|---|---|---|---|---|---|---|
| Thickness mils | 0.64 | 0.75 | 0.35 | 0.5 | 0.75 | 1.0 | 0.20 |
| Tensile Strength psi | | | | | | | |
| Lengthwise | 4500 | 5290 | 5690 | 5040 | 4380 | 4500 | 3440 |
| Transverse | 3660 | 4220 | 2480 | 2860 | 3120 | 2900 | 2970 |
| Elongation, % | | | | | | | |
| Lengthwise | 162 | 289 | 220 | 320 | 397 | 455 | 578 |
| Transverse | 259 | 341 | 569 | 523 | 547 | 515 | 599 |
| Graves Tear, g/mil | | | | | | | |
| Lengthwise | 151 | 137 | 142 | 150 | 171 | 179 | 191 |
| Transverse | 193 | 191 | 208 | 183 | 197 | 180 | 198 |
| Elmendorf Tear g/mil | | | | | | | |
| Lengthwise | 90 | 19.4 | 195 | 177 | 252 | 194 | 318 |
| Transverse | 168 | 23.3 | 260 | 177 | 284 | 300 | 323 |
| MVTR (1) | 38.9 | 1.2 | 30.6 | 26.6 | 14.5 | 10.4 | 4.9 |
| Gas Transmission Rates (2) | | | | | | | |
| Oxygen | 887 | 442 | — | — | 580 | 361 | 194 |
| Carbon Dioxide | 3339 | 1667 | — | — | 2850 | 2036 | 1194 |
| Specific Gravity, g/cc | 1.247 | 0.941 | 0.957 | 0.957 | 0.957 | 0.957 | 0.957 |
| Light Transmission, % | 91.4 | 92.2 | 92.3 | 92.4 | 92.5 | 92.7 | 92.6 |
| Haze, % | 0.8 | 1.7 | 0.1 | 0.2 | 0.1 | 0.1 | 0.0 |
| Seal Temperature, °F | 370 | 230 | 210 | 210 | 210 | 230 | 230 |
| Meat Keeping (3) | | | | | | | |
| 24 hr. | 1.0 | 1.25 | — | 1.10 | 1.10 | — | — |
| 48 hr. | 1.0 | 1.55 | — | 1.20 | 1.25 | — | — |
| 72 hr. | 1.10 | 1.65 | — | 1.40 | 1.35 | — | — |
| 212° F Shrink, % | | | | | | | |
| Lengthwise | — | — | — | −8.1 | — | — | — |
| Transverse | — | — | — | −4.8 | — | — | — |

(1) General Foods Moisture Vapor Transmission Rates determined in a General Foods Chamber (ASTM E 96) and expressed in grams of water vapor transmitted through a test film of stated thickness and having an area of 100 in.², in a 24-hour period at 100° F and 90% R.H.
(2) In cubic centimeters (STP) of gas transmitted through a test film of stated thickness having an area of 100 in.² in a 24-hour period under 1 atm. pressure of stated gas at 23° C. Determination made with a Dow Cell (ASTM 1434).
(3) The cuts of meat are packaged in standard supermarket plastic or pulp trays, overwrapped, and placed in a supermarket display refrigerator unit usually maintained at about 35° F. The packaged meat is observed for appearance and color change at 24-hour intervals and rated in comparison with freshly cut meat. The lower the number the better the meat keeping, i.e., a rating of 1.00 means that the packaged meat was essentially unimpaired in color and appearance from freshly cut product. A rating of 2.00 means that the meat is black and not acceptable.

EXAMPLE 7

In this example the properties of one of the preferred ethylene-vinyl acetate copolymers (8A, Tables III and VI) employed as a feedstock in this invention are compared with those of two of the especially preferred hydrolyzed derivatives obtained therefrom by the alcoholysis technique as described in Example 1. Partially hydrolyzed copolymer 8B was the product of a single batch alcoholysis run whereas partially hydrolyzed copolymer 8C was a blend of two individual substantially identical runs.

Table III characterizes the two hydrolyzed resins as obtained from the alcoholysis process. Table IV gives the conditions used to pelletize the granular hydrolyzed resin of Table III. Table V provides the film-blowing conditions employed to convert the pellets to the final 1.5 and 3.0 mil films for testing, and the test results are summarized in Table VI, along with those for 1.5 and 3.0 mil film made from the ethylene-vinyl acetate resin used as the alcoholysis feedstock. If desired, film can also be prepared from hydrolyzed resin powder such as that described in Table III.

The data in Table VI for 1.5 and 3.0 mil film thicknesses show that the partially hydrolyzed resins of this invention (Resins No. 8B and 8C) are significantly better than the parent ethylene-vinyl acetate copolymer (Resin 8A) in tensile strength and modulus, and have lower haze and higher gloss. The deficiencies of the parent copolymer in these important properties alone would strongly mitigate against its use as a packaging material for fresh meat and produce, despite the favorable values of MVTR and oxygen transmission that are observed.

Moreover, a film prepared from the parent resin 8A is extremely blocky, a factor that would also practically eliminate it from consideration as a fresh meat and produce wrap, whereas film made from the hydrolyzed resins 8B and 8C [as well as the thin film of Examples 2-4 (Table II)] present no serious problems due to blocking under normal conditions. The blocking of the parent copolymer can be associated, in part, with its lower surface hardness. The Shore Hardness values for the parent copolymer are 79(A) and 28(B); Shore Hardness values of 94(A) and 47(B), and 94(A) and 46(B) have been found for the hydrolyzed resins 8B and 8C, respectively.

Although the $O_2$ transmission rates and MVTR values of 1.5 and 3.0 mil films of the hydrolyzed copolymers of this example lie below the lower limits of the desired ranges, i.e., below 350 cc of $O_2$/100 in.$^2$/24 hr./atm. at 23° C. and 10 g of $H_2O$/100 in.$^2$/24 hours, extrapolation of these observed values for 1.5 and 3.0 mils to a film thickness of 0.75 mil, a very desirable film thickness for fresh meat and produce wrap, yields transmission rates that are within the said limits and that accord well with actual measurements made on 0.75 mil film (Table II).

TABLE III
Properties of Partially Hydrolyzed EVA Copolymers Obtained from Alcoholysis Process

| Resin No. | BA (1) | 8B | Run #1 | 8C | Run #2 |
|---|---|---|---|---|---|
| Residual VA, wt.% (saponification) | 26.1 | 11.4 | 13.2 | | 13.7 |
| Melt Index, g/10 min. | 2.1 | 4.48 | | 4.72 | |
| Volatiles, % | — | 0.79 | 0.68 | | 0.67 |
| Particle Size, % | | | | | |
| 16 mesh | — | 15.9 | 16.4 | | 31.1 |
| 20 mesh | — | 9.4 | 6.5 | | 16.8 |
| 35 mesh | — | 14.7 | 9.9 | | 20.5 |
| 50 mesh | — | 19.3 | 12.8 | | 15.2 |
| 100 mesh | — | 24.0 | 17.1 | | 10.8 |
| Pan | — | 16.6 | 37.3 | | 5.6 |

(1) EVA feedstock alcoholyzed to obtain Resins No. 8B and 8C

TABLE IV
Pelletizing Conditions for Hydrolyzed Resins in 2.5 in. Extruder(1)

| Resin No. | 8B | 8C(2) |
|---|---|---|
| Extrusion Temperature, ° F. | | |
| Barrel Zone 1 | 258 | 258 |
| 2 | 310 | 308 |
| 3 | 310 | 310 |
| 4 | 328 | 340 |
| Die Zone 1 | 280 | 280 |
| 2 | 280 | 280 |
| Melt Temperature, ° F. | 280 | 280 |
| Screw Type | polyethylene | polyethylene |
| Screw Speed, rpm | 72 | 72 |
| Extruder Current, amps | 17.5 | 17.5 |
| Die Pressure, psi | | |
| Zone 1 | 4500 | 4400 |
| Zone 2 | 3700 | 3400 |
| Gate | 2200 | 1800 |

(1)Single screw conventional extruder, 20/1 L/D ratio, National Rubber Machinery Corporation
(2)Blend of Runs Nos. 1 and 2, Table III

TABLE V
Conditions for Blowing Film from Hydrolyzed Resins(1)

| Resin No. | 8B | | 8C(2) | |
|---|---|---|---|---|
| Film gage, mils | 1.5 | 3.0 | 1.5 | 3.0 |
| Melt Temperature, ° F | 300 | 300 | 300 | 300 |
| Die Pressure, psi | 2000 | 2300 | 1900 | 2200 |
| Die gap, m. | 0.025 | 0.025 | 0.025 | 0.025 |
| Frost line, in. | 10 | 10 | 10 | 10 |
| Layflat width, in. | 15 | 15 | 15 | 15 |
| Blow-up ratio | 3.2 | 3.2 | 3.2 | 3.2 |
| Take off, fpm | 15 | 10 | 15 | 10 |
| Extruder, rpm | 60 | 85 | 60 | 85 |

(1)Film-blowing equipment: 1.5 in. single screw, Moderan Plastics Machinery Corporation, 3 in. die
(2)Blend of Runs No. 1 and No. 2, Table III

TABLE VI
Properties of 1.5 and 3.0 mil Film from Partially-Hydrolyzed Resins

| Resin No. | 8A(1) | | 8B | | 89C | |
|---|---|---|---|---|---|---|
| Film gage, mil | 1.5 | 3.0 | 1.5 | 3.0 | 1.5 | 3.0 |
| Tensile, psi | | | | | | |
| lengthwise | 1281 | 2349 | 2338 | 2615 | 2558 | 2514 |
| transverse | 1288 | 1623 | 1914 | 2811 | 1806 | 2110 |
| Yield, psi | | | | | | |
| lengthwise | no point | no point | no point | no point | no point | no point |
| transverse | no point | no point | no point | no point | no point | no point |
| Elongation, % | | | | | | |
| lengthwise | 254 | 519 | 144 | 331 | 213 | 343 |
| transverse | 312 | 415 | 252 | 324 | 243 | 272 |
| Modulus, psi | | | | | | |
| lengthwise | 2020 | 2340 | 6820 | 11,180 | 7580 | 8000 |
| transverse | 1670 | 2880 | 6450 | 5770 | 6410 | 8000 |
| Elmendorf Tear | | | | | | |
| lengthwise | 65 | 89 | 57 | 142 | 72 | 185 |
| transverse | 158 | 81 | 130 | 150 | 175 | 156 |
| Haze, % | 3.2 | 3.7 | 2.0 | 1.8 | 1.8 | 1.5 |
| Gloss, % | 12.3 | 12.1 | 13.6 | 14.2 | 13.7 | 14.3 |
| MVTR(2) g/100 in.$^2$/24 hrs. | 9.6 | 6.4 | 5.8 | 4.1 | 6.4 | 3.3 |
| g/100 in.$^2$/24 hrs./0.75 mil | 19.2 | 16.4 | 11.6 | 16.4 | 12.8 | 13.2 |
| O Transmission(3) | | | | | | |
| cc/100 in$^2$/24 hr./atm. at 23° C | 654 | 305 | 277 | 118 | 287 | 146 |
| cc/100 in.$^2$/24 hr./atm. at 23° C | 1310 | 1225 | 554 | 477 | 575 | 585 |
| Part drop, gms. | | | | | | |

TABLE VI-continued

| Resin No. | Properties of 1.5 and 3.0 mil Film from Partially-Hydrolyzed Resins | | | | | |
|---|---|---|---|---|---|---|
| | 8A(1) | | 8B | | 89C | |
| F/50, 5 ft. drop | (4) | 708 | (4) | 612 | 339 | 795 |

(1)EVA feedstock alcoholyzed to obtain Resins Nos. 8B and 8C
(2)The MVTR was measured with a Honeywell Model W 825 Water Vapor Transmission Rate Tester. The values obtained were converted into General Foods units and are reported as such, i.e., as grams of water transmitted through a test film of the stated thickness hving an area of 100 in.$^2$, in a 24 hour period at 100° F and 90% R.H. In the second line each value has been calculated for a film thickness of 0.75 mil on the assumption that MVTR is inversly proportional to film thickness.
(3)The O$_2$ transmisson rates were obtained with a Dohrmann Polymeric Permeation Analyzer, PPA-1, and are reported both for the stated film thicknesses and as calculated for a 0.75 mil film thickness on the assumption that the transmission rate is inversely proportional to film thickness.
(4)At a loading of 421 g., 0 out of 10 specimens broke at a 26" drop.

It will be understood that various changes may be made in the preferred embodiments of the invention described hereinabove without departing from the scope of the present invention. Accordingly, the preceding description should be construed as illustrative and not in a limiting sense.

What is claimed is:

1. A blown packaging film for foods constituted of unplasticized, alcoholyzed ethylene-vinyl acetate resin prepared by alcoholyzing an ethylene-vinyl acetate copolymer containing from 20 to 35 weight percent combined vinyl acetate and having a melt index of from 0.5 to 20 g/10 min. in a reaction medium comprising as components thereof said ethylene-vinyl acetate copolymer, a low-boiling alcohol, a hydrocarbon solvent in an amount up to 1000 parts by weight per part of the alcohol and an alkaline or acidic catalyst, wherein the aggregate initial amount of water contained in the copolymer, the alcohol, the hydrocarbon solvent and the catalyst prior to the alcoholysis reaction is no more than 10% of the weight thereof, regulating the aggregate water content of said components introduced into a single alcoholysis reaction and into successive, otherwise identical alcoholysis reaction runs as not to vary by more than 50% by weight of said aggregate water content thereof, maintaining the reaction medium throughout the reaction and throughout successive reaction runs under a dry, inert atmosphere, and otherwise carrying out the alcoholysis under conditions preventing the addition or loss of substantial quantities of water to or from said medium;

said alcoholyzed resin containing from 8 to 18 weight percent residual vinyl acetate and having a melt index of from 0.5 to 10 g/10 min.

2. The packaging film of claim 1, wherein the ethylene-vinyl acetate copolymer contains from 25 to 30 weight percent combined vinyl acetate and has a melt index of from 2 to 5 g/10 min.; and wherein said alcoholyzed ethylene-vinyl acetate resin contains from 10.6 to 14.5 weight percent residual vinyl acetate and has a melt index of from 4.4 to 5.1 g/10 min.

3. The packaging film of claim 1 for wrapping fresh red meat and exhibiting an oxygen transmission rate greater than 350 cc/100 sq. in./24 hr./atm. at 23° C., a carbon dioxide transmission rate greater than 1000 cc/100 sq. in./24 hr./atm. at 23° C., and a moisture vapor transmission rate of from 10 to 50 g/100 sq. in./24 hr. at 100° F. and 90% R.H., said film being prepared from an ethylene-vinyl acetate copolymer containing 25–30 weight percent combined vinyl acetate and having a melt index of from 2 to 5 g/10 min., and the alcoholyzed ethylene-vinyl acetate resin thereof containing from 10.6 to 14.5 weight percent residual vinyl acetate and having a melt index of from 4.4 to 5.1 g/10 min.

4. The packaging film of claim 1, wherein the ethylene-vinyl acetate copolymer incorporates an additional comonomer in an amount of up to 10% by weight thereof, said comonomer being selected from among vinyl formate, vinyl propionate, vinyl butyrate, vinyl trimethyl acetate, vinyl trifluoroacetate, carbon monoxide, methyl acrylate, n-butyl acrylate, di-n-butyl maleate, diethyl itaconate, acrylic acid, methacrylic acid or fumaric acid.

5. The packaging film of claim 1, having a thickness of from 0.35 to 1.0 mil.

6. A substantially colorless, clear packaging film for foods, of high gloss and sparkle, said film exhibiting an oxygen transmission rate greater than 350 cc/100 sq. in./24 hr./atm. at 23° C., a carbon dioxide transmission rate greater than 1000 cc/100 sq. in./24 hr./atm. at 23° C., a moisture vapor transmission rate of from 10 to 50 g/100 sq. in./24 hr. at 100° F. and 90% R.H., and a haze level of less than 1%, said film being constituted of an unplasticized, alcoholyzed ethylene-vinyl acetate resin prepared by the solution hydrolysis of an ethylene-vinyl acetate copolymer containing from 20 to 35 weight percent combined vinyl acetate and having a melt index of from 0.5 to 20 g/10 min., said alcoholyzed resin containing from 8 to 18 weight percent residual vinyl acetate and having a melt index of from 0.5 to 10 g/10 min.

* * * * *